Nov. 5, 1957 D. L. BROWN 2,812,413
ELECTRIC HEATING SYSTEM
Filed Dec. 17, 1954
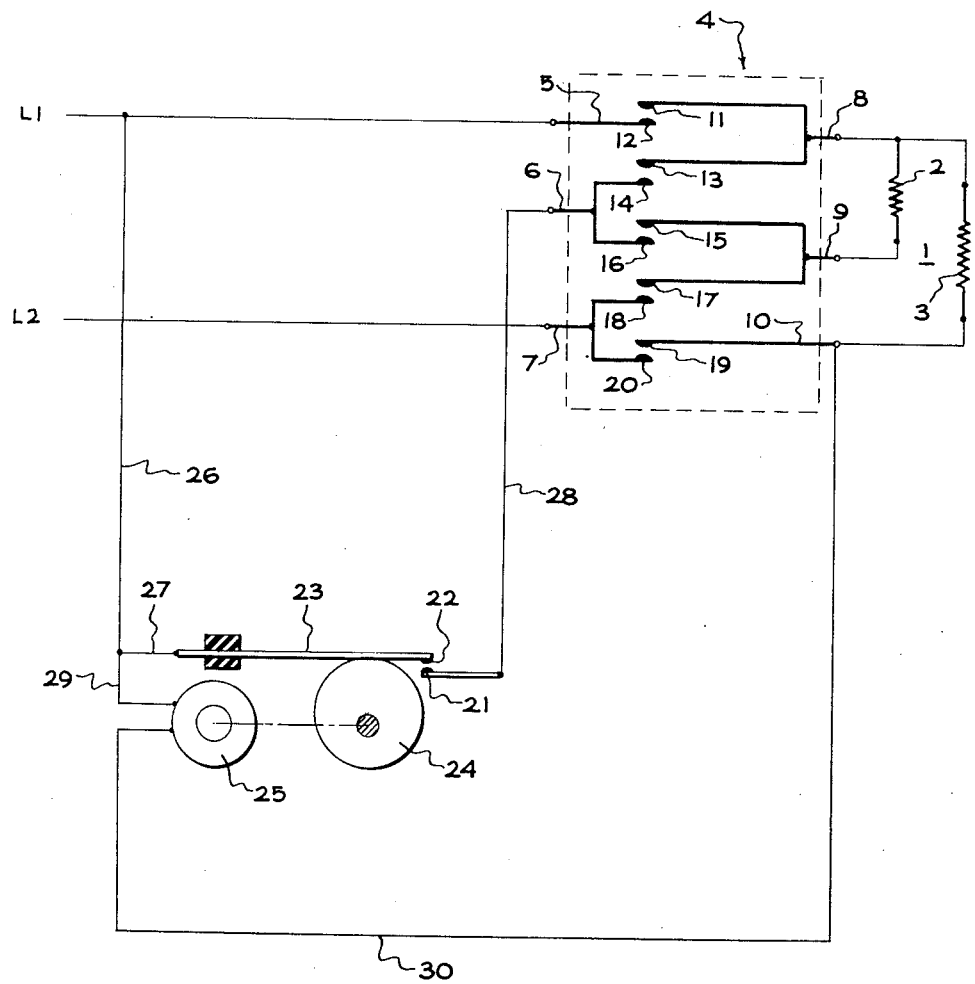
INVENTOR.
DELBERT L. BROWN
BY
HIS ATTORNEY

United States Patent Office 2,812,413
Patented Nov. 5, 1957

2,812,413

ELECTRIC HEATING SYSTEM

Delbert L. Brown, Louisville, Ky., assignor to General Electric Company, a corporation of New York Application December 17, 1954, Serial No. 475,858

3 Claims. (Cl. 219—20)

This invention relates to electric heating systems, and more particularly to heating systems for heating appliances such as electric ranges and the like.

One of the problems which has been encountered in connection with the manufacture of electric ranges designed for use both in the United States and in foreign countries stems from the different power distribution systems in use in the various countries. While in the United States high wattage heating devices such as electric ranges are commonly designed for energization from a three wire single phase 230 volt alternating current power supply, power in many countries is supplied over a two wire system energized at a voltage of the order of 200 to 250 volts. Thus a range having a two element surface heating unit controlled by a multiple contact switch arranged to connect the two elements in various combinations to the 230 volt and 115 volt supply lines of a three wire source cannot be operated from a two wire source so as to produce the series of graduated heats provided by operation on a three wire power source. Consequently, it has been customary to install special switches designed for use with two wire power sources and providing only a limited number of heating positions on those ranges intended for export to other countries.

Accordingly, a principal object of the present invention is to provide a system for energizing a heating appliance such as an electric range or the like from a two wire power source utilizing switches and other circuit elements designed for use with a three wire single phase power source.

Further objects and advantages of my invention will become apparent as the following description proceeds, and the features of novelty which characterize my invention will be pointed out with particularity in the claims annexed to and forming a part of this specification.

Briefly stated, in accordance with one aspect of my invention I provide a simulated three wire power supply system energized by a two wire power source, in which the two wires supply power at a relatively high voltage corresponding to that supplied by the two energized lines of a three wire source, and means for supplying power at the same voltage but periodically interrupted so as to reduce the wattage output of heating elements energized thereby to a value corresponding to their wattages when connected across one of the energized lines and the neutral line of a three wire power source.

For a better understanding of my invention reference may be made to the accompanying drawing in which the single feature is a diagrammatic view of an electric heating system embodying my invention.

Referring now to the drawing, the numeral 1 designates a multiple element electric heater having heating elements 2 and 3, such as a surface heating unit of an electric range. Energization of heater 1 is controlled by a switch 4 of the type having three input terminals 5, 6 and 7 and adapted to selectively connect heating elements 2 and 3 to a three wire single phase power supply so as to provide a plurality of heat outputs. While various types of switches may be utilized, one switch suitable for use in the present invention is disclosed in Patent 2,431,904—Andrews. Switch 4 is provided with three output terminals 8, 9 and 10, output terminal 8 being connected by a common conductor to heating elements 2 and 3, output terminal 9 being connected to the other end of heating element 2, and output terminal 10 being connected to the other end of heating element 3. As disclosed in the Andrews patent, switch 4 includes five switches providing five different circuit connections whereby the switch may be operated to produce five different heat output from heater 1. Thus assuming that input terminals 5, 6 and 7 are connected to the energized lines of a three wire single phase power supply and terminal 6 is connected to the neutral line of the supply, closure of switch contacts 11—12, 17—18 and 19—20 connects heating elements 2 and 3 in parallel across 230 volts to produce high heat output. Second heat is provided by closure of contacts 11—12 and 19—20 so as to connect heating element 3 alone across 230 volts; third heat is provided by closure of contacts 13—14, 17—18 and 19—20 so as to connect both heating elements in parallel across 115 volts; low heat is provided by connecting contacts 13—14 and 19—20 so as to connect heating element 3 alone across 115 volts; and "warm" heat is provided by closure of contacts 15—16 and 19—20 so as to connect heating elements 2 and 3 in series across 115 volts.

In accordance with the present invention I have provided means for energizing the heating system including heating unit 1 and switch 4 from a two wire voltage source $L_1$, $L_2$ energized in the range between 200 and 250 volts, such as is sometimes found in countries other than the United States. As illustrated in the drawing, the two wires of the two wire source $L_1$, $L_2$ are connected to input terminals 5 and 7 of switch 4 respectively, these terminals being ordinarily connected to the energized lines of a three wire power source as explained above. Also provided is a third circuit connection for supplying the same voltage to input terminal 6; however, the lower voltage at which terminal 6 is ordinarily energized is simulated by periodically interrupting this third circuit connection. One device well suited for performing this function comprises switch structure including a fixed contact 21, a movable contact 22 carried on a flexible arm 23, and a cam 24 engaging arm 23 and driven by a constant speed motor 25 so as to periodically open and close contacts 21 and 22. Contacts 21 and 22 are connected between line $L_1$ of the power supply and input terminal 6 of switch 4 by wires 26, 27 and 28. It is generally desirable to operate motor 25 only when heating unit 1 is energized and hence the operation of motor 25 is preferably controlled by contacts 19—20 of switch 4, the circuit for the motor and these contacts being provided by wires 26, 29 to one terminal of the motor and by wire 30 connecting the other terminal to output terminal 10 of the switch.

Motor 25 preferably drives cam 24 at a speed such that contacts 21 and 22 are opened and closed in a time interval of the order of one minute, while the configuration of cam 24 is preferably such that the ratio of open time to closed time is substantially four to one. By this means the wattages produced by heating unit 1 when switch 4 is actuated to third, low or warm heat positions will equal the corresponding wattages produced when switch 4 is connected to a three wire power supply, inasmuch as the power output of a fixed resistance is a function of the square of the voltage impressed thereon. In other words, the average wattage output of a fixed resistance, such as heating element 2, energized at 230 volts for a period of fifteen seconds at one minute intervals equals the output of the same resistance continuously energized at 115 volts. However in some circumstances it might be desirable to alter the wattage outputs of the heats produced by closure of switches connected to input terminal 6, and this might of course be done by utilizing a cam having a contour arranged to actuate contact 22 at a rate such that some off-on ratio other than four to one is obtained.

From the foregoing it will be seen that I have provided a convenient and simple arrangement for adapting heating appliances such as electric ranges for connection to either two wire or three wire power supply systems. It should of course be appreciated that means for periodically interrupting the circuit connection to the input terminal 6 of switch 4 may assume forms other than a motor driven switch actuating cam, since other means for periodically opening and closing contacts are well known in the art.

While I have shown and described a specific embodiment of my invention I do not desire my invention to be limited to the particular construction shown and described and I intend by the appended claims to cover all modifications within the true spirit and scope of the invention.

What I claim as my invention is:

1. An electric heating system comprising an electric heater having two heating elements, a control switch having first and second input terminals adapted to be connected to the energized wires of a three-wire single phase power source and a third input terminal adapted to be connected to the neutral wire of such a source, said control switch having manually operable contact means for connecting said heating elements in a plurality of heating circuits including one circuit in which one of said heating elements is connected to said first input terminal and said second input terminal, and another circuit in which one of said heating elements is connected to said first input terminal and said third input terminal, means for energizing said control switch from a two-wire power source comprising first and second circuit connections between the two-wire power source and said first and second input terminals respectively, a third circuit connection between one of the two wires of the two-wire power source and said third input terminal, and means for periodically interrupting said third circuit connection, said interrupting means including a pair of contacts in said third circuit connection and means for opening and closing said contacts at a rate such that the ratio of open time to closed time is substantially four to one.

2. An electric heating system as defined in claim 1 in which said switching means includes means for energizing said interrupting means upon actuation of said switching means so as to energize said heater.

3. An electric heating system as defined in claim 1 in which said interrupting means includes a fixed contact and a movable contact connected in said third circuit connection, constant speed rotary cam means for opening and closing said contacts at a rate such that the ratio of open time to closed time is substantially four to one, a constant speed motor arranged to rotate said cam, and means for energizing said motor upon actuation of said switch so as to energize said heater.

References Cited in the file of this patent

UNITED STATES PATENTS

| | | |
|---|---|---|
| 1,849,847 | Mittnacht | Mar. 15, 1932 |
| 1,919,949 | Kempton | July 25, 1933 |
| 2,179,782 | Frankel et al. | Nov. 14, 1939 |
| 2,201,584 | Kahn et al. | May 21, 1940 |
| 2,329,417 | Pearce | Sept. 14, 1943 |
| 2,439,270 | Sharp | Apr. 6, 1948 |
| 2,549,461 | Haller | Apr. 17, 1951 |